A. T. LARGE.
Hand-Seeder.
No. 60,019.  
Patented Nov. 27. 1866.
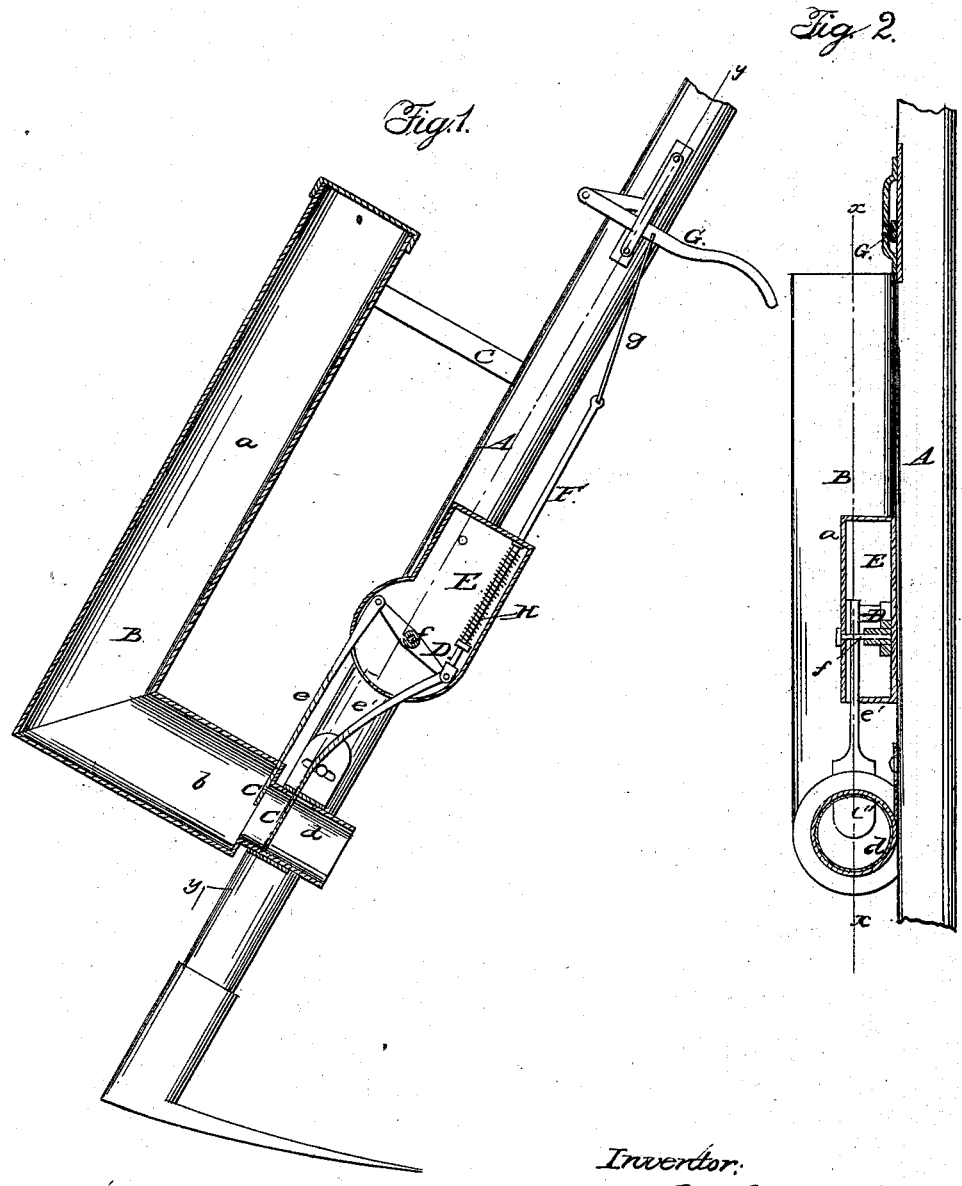

United States Patent Office.

IMPROVEMENT IN HAND SEED-PLANTER.

A. T. LARGE, OF TOMAH, WISCONSIN.

Letters Patent No. 60,019, dated November 27, 1866; antedated November 17, 1866.

---

SPECIFICATION.

TO ALL WHOM IT MAY CONCERN:

Be it known that I, A. T. LARGE, of Tomah, in the county of Monroe, and State of Wisconsin, have invented a new and improved Combination of Hoe and Seed-Planter; and I do hereby declare that the following is a full, clear, and exact description thereof, which will enable others skilled in the art to make and use the same, reference being had to the accompanying drawings, forming part of this specification, in which—

Figure 1 is a side sectional view of my invention taken in the line $x\ x$, fig. 2.

Figure 2, a front sectional view of the same taken in the line $y\ y$, fig. 1.

Similar letters of reference indicate like parts.

This invention consists in a new and improved combination of a hoe and seed-planter, as hereinafter fully shown and described, whereby holes may be made in the earth to receive the seed, the seed dropped in the holes and then covered, the work all being performed with the same implement and with great facility and expedition.

A represents a handle having a hoe attached to it as usual, the length of the handle being equal to that of an ordinary hoe handle; in fact the invention may be applied to an ordinary hoe. B represents a tube formed of two parts, $a\ b$, connected by an elbow at right angles with each other, one part, $a$, being longer than the other part, $b$, and having a position about parallel with the handle A—see fig. 1; the part $a$, near its outer end, is secured to the handle A, by a bar, $c$, the opposite end of said part being supported by the short part $b$, from the handle A. The short part $b$, has a short tube or extension $d$, communicating with it, said tube $d$, being considerably less in diameter than the part $b$, and having two slide valves, C C′, fitted in it, one of which, C, is at the junction of the part $b$, of the tube B, and the small tube $d$, as shown clearly in fig. 1. These valves, C C′, are allowed to slide freely in the small tube $d$, and they are attached by rods, $e\ e$, to opposite ends of a lever, D, which is fitted in a box, E, attached to the handle A, and works centrally on a pivot or shaft, F. The inner end of this lever D, has a rod F, attached to it which passes through the rear end of the box E, and is connected by a rod or link, $g$, with a lever G, attached to the handle. On the rod F, within the box E, there is placed a spiral spring H, which has a tendency to keep the valve C′ closed or across the tube $d$, and the valve C open, as will be fully understood by referring to fig. 1. The corn to be planted is placed in the tube B, and the hoe is used in the ordinary way, and whenever it is necessary to drop the seed, the operator actuates the lever G, and thereby opens or draws back the valve C′, and closes or shoves forward the valve C, the seed contained in the space between the two valves dropping into the hole made by the hoe, while the valve C holds the seed in tube B during the dropping operation. On releasing the lever G, the spring H throws back the valves to their original position.

Having thus described my invention, I claim as new, and desire to secure by Letters Patent—

The tubes B, provided with the valves C C′, arranged with the levers D G, and spring H, and applied to the handle of a hoe, to operate in the manner substantially as and for the purpose herein set forth.

The above specification of my invention signed by me this 21st day of February, 1866.

A. T. LARGE.

Witnesses:
L. S. BARNES,
G. W. MILLER.